L. R. COMPTON.
WIRE FORMING MACHINE.
APPLICATION FILED JAN. 14, 1908.

947,296.

Patented Jan. 25, 1910.

Witnesses
G. V. James
E. Harrington

L. R. Compton
Inventor
By his Attorney F. E. Stebbins

L. R. COMPTON.
WIRE FORMING MACHINE.
APPLICATION FILED JAN. 14, 1908.

947,296.

Patented Jan. 25, 1910.
6 SHEETS—SHEET 2.

Witnesses
G. V. James
E. Harrington

L. R. Compton
Inventor
By his Attorney F. E. Stebbins

L. R. COMPTON.
WIRE FORMING MACHINE.
APPLICATION FILED JAN. 14, 1908.

947,296.

Patented Jan. 25, 1910.
6 SHEETS—SHEET 3.

L. R. COMPTON.
WIRE FORMING MACHINE.
APPLICATION FILED JAN. 14, 1908.

947,296.

Patented Jan. 25, 1910.
6 SHEETS—SHEET 5.

Witnesses
G. V. James
E. Harrington

L. R. Compton, Inventor
By his Attorney F. E. Stebbins

L. R. COMPTON.
WIRE FORMING MACHINE.
APPLICATION FILED JAN. 14, 1908.

947,296.

Patented Jan. 25, 1910.
6 SHEETS—SHEET 6.

UNITED STATES PATENT OFFICE.

LEWIS RANSFORD COMPTON, OF SUMMIT, NEW JERSEY, ASSIGNOR, BY MESNE ASSIGNMENTS, TO FABRICATED STEEL COMPANY, (TRUSTEE,) OF NEWARK, NEW JERSEY, A CORPORATION OF NEW JERSEY.

WIRE-FORMING MACHINE.

947,296.      Specification of Letters Patent.      Patented Jan. 25, 1910.

Application filed January 14, 1908. Serial No. 410,782.

*To all whom it may concern:*

Be it known that I, LEWIS RANSFORD COMPTON, a citizen of the United States, and a resident of Summit, in the county of Union and State of New Jersey, have invented a certain new and useful Wire-Forming Machine, of which the following is a specification.

My invention relates to wire forming machinery and consists of a machine for the manufacture of a particular wire fabric employed in reinforced concrete construction.

Heretofore concrete structures comprising girders, beams, floor slabs, columns, pipes, etc., formed of reinforced concrete required different types of steel reinforcement; but whereas the standard fabric produced by my invention can with variation of sizes, be employed for all of these various purposes, it will be readily seen that a machine which can be adjusted for manufacturing the various sizes required of this product forms an economical and practical basis for manufacture, eliminating all work on the wire fabric at the building, and produces a product in any desired size identical in its various units. With this machine it is also possible to produce a continuous wire girder for reinforced concrete construction eliminating the necessity of tying girders together over supports and consequently affords a means of reinforcing concrete superior to any method heretofore known. With this machine it is also possible to simultaneously with manufacturing prepare the product for economical handling and shipment.

The machine shown in the accompanying specifications and drawings is susceptible of changes and modifications so that in place of one fabric being manufactured at a time a plurality can be simultaneously produced by giving the machine a plurality of heads, the various elements of which would work together simultaneously as will be hereinafter more clearly set forth.

In the accompanying drawings in which similar characters of reference refer to similar parts.

Figure 2:
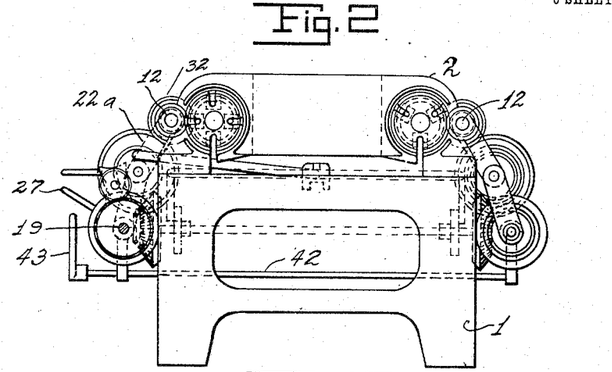
Fig. 2 is a rear elevation on the line A—B. looking in the direction of the arrow of Fig. 1.
Figure 3:
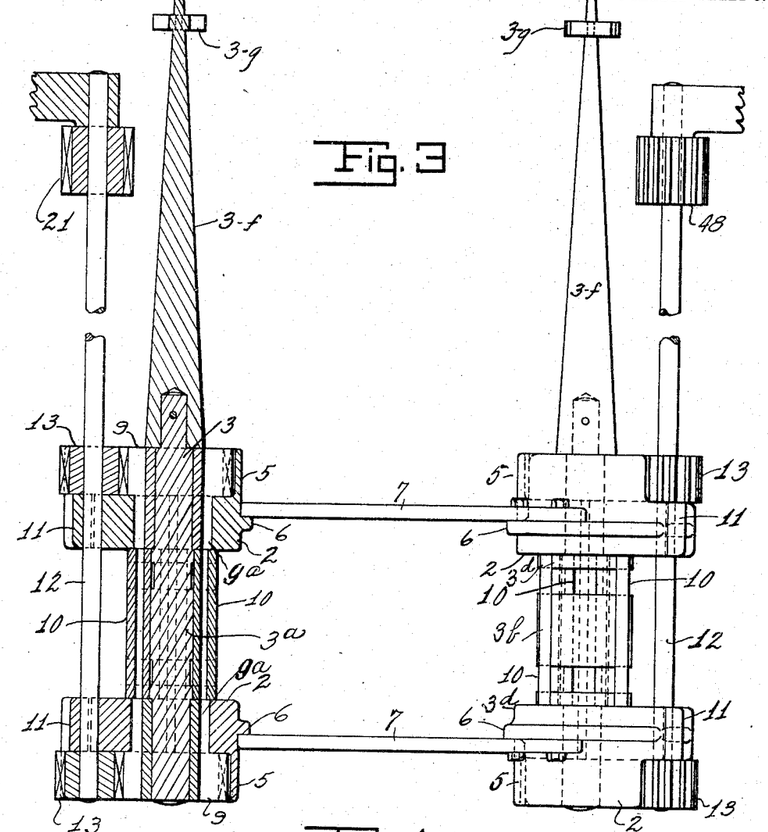
Fig. 3 is a plan view on an enlarged scale of the forming heads of the machine, the left hand side being shown in section on the line C. D. of Fig. 4 looking in the direction of the arrow.
Figure 4:
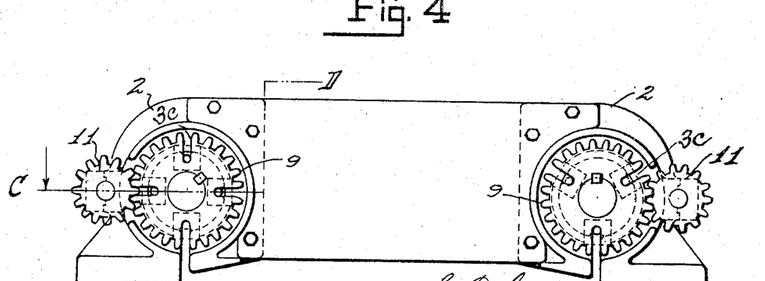
Fig. 4 is an end elevation of Fig. 3.
Figure 8:
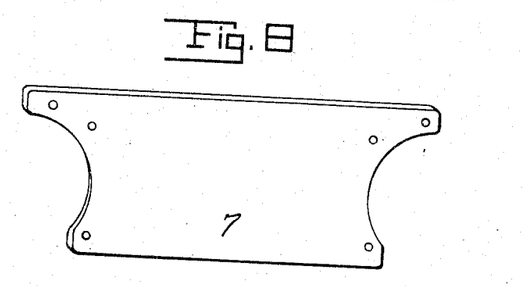
Figs. 8 and 9 show the spacer plates employed in the machine.
Figure 9:
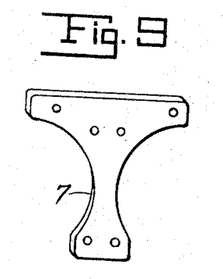
Figure 10:
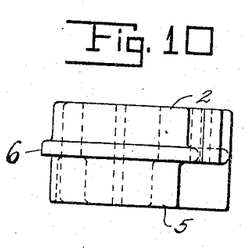
Figs. 10 and 11 are plan and end views of the bearing boxes I employ for the forming heads.
Figure 11:
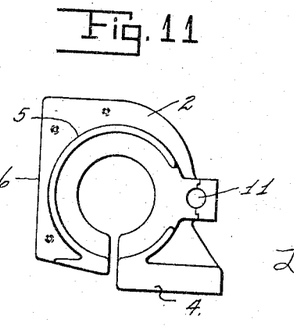
Figure 12:
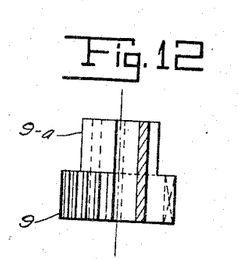
Figs. 12 and 13 show respectively in plan and section an end elevation of the driving gears and their bearings employed on the forming heads as shown in Fig. 5.
Figure 13:
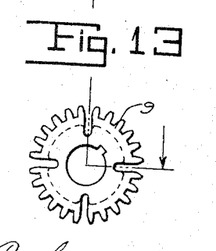

In the construction of my invention I employ a suitable stand or table 1 (see Fig. 2) on which at various points are located bearings, etc., to accommodate the necessary shafting, brakes, etc. hereinafter described. Mounted upon the top of said table 1 are four bearings 2, 2, 2, 2, which are arranged in pairs as will be seen from Fig. 1 of the drawings, thus forming two bearings in each of which is mounted a forming head 3. From the drawings, (Fig. 11) it will be seen that these bearings are of a peculiar shape and design and might be described as an overhanging bearing having a base 4 which rests upon the top of the table and is bolted thereto, while the inner side of the bearing is higher on its lower face than said base 4. This bearing is provided with an extending circular sleeve 5 (Fig. 10) which forms a shield for the drive gears hereinafter mentioned. The inner sides of these bearings (inner being employed to designate that side opposite the base) have formed thereon a web 6 to which is bolted a spacer plate 7, and the ends of said spacer plate are bolted to the corresponding rib 6 in the registering bearing, as will be seen from Figs. 3 and 4 thus giving stiffness to the overhanging sections of the bearings and simultaneously spacing the centers of said bearings at any desired distance. It will be seen from Figs. 8 and 9 that these spacing plates 7, 7 are of various sizes so that the bearing and forming heads can be moved toward or apart from each other for the purpose of regulating the distance "A" of the fabric as shown in Fig. 23.

Figure 23:
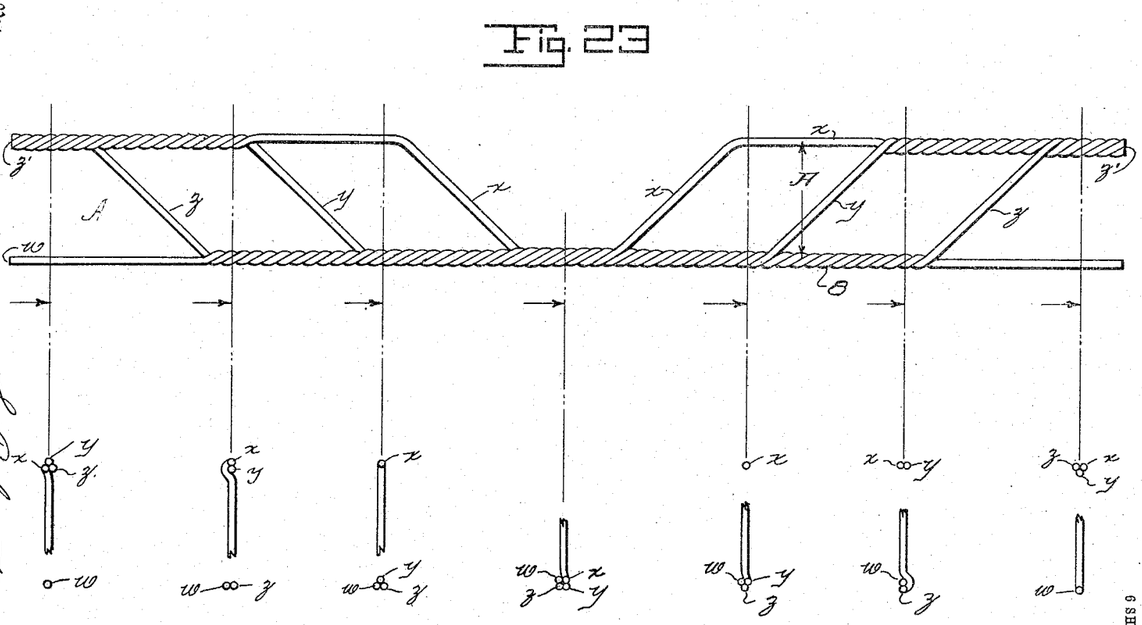
Fig. 23 is a diagram of the product produced by this machine also line at which the sections appear.

As will be seen from Fig. 23 the product I manufacture in this machine is a wire fabric which consists at one end of a single wire $w$ which throughout the length of the fabric I designate whether alone or twisted with the other wires as the lower member. The upper member consists of a strand of three wires $x\ y\ z$. It will be seen that a machine is necessary that will twist or strand the wires $x\ y\ z$ in to the upper members $z^1$ as the fabric is pulled through the machine while simultaneously and for a predetermined distance the lower member $w$ comprises but a single wire. At a predetermined point one of the three wires $z$ of the upper member $z^1$ is withdrawn and at a predetermined point is joined to the lower member $w$ thus forming thereby a shear member which lies at an angle of 45 degrees. This wire $z$ is then twisted with wire $w$ forming a pair for the lower member up to a predetermined point when a second wire $y$ is similarly transferred from the upper member $z^1$ to the lower member, leaving but a single wire $x$ for the upper member which at the proper moment is similarly transferred to the lower member forming for the center of the fabric a four wire strand or rope. At a predetermined time wire $x$ is withdrawn from this four wire strand and is carried so as to again form the upper member $z^1$. At a predetermined time a second wire $y$ is similarly transferred and joined with $x$ in the upper member $z^1$ while subsequently the wire $z$ is similarly transferred to the upper member $z^1$, leaving the end of the fabric a duplicate of the beginning as will be seen from Fig. 23. The object of my machine therefore is to twist these wires together into the shape and form shown in Fig. 23, transferring at regular intervals the several wires $x\ y\ z$ of the upper member to the lower member $w$ and reversing this motion retransferring them to their original and relative position for the purpose of forming the upper member of the latter half of the fabric. It will be seen that this cycle of operation can be indefinitely prolonged so as to form a fabric of any required length, or each fabric similar to Fig. 23 can be manufactured as a unit. It will also be seen that the distance A between upper member $z^1$ and lower member $w$ can be readily adjusted by an arrangement of the machine by moving the forming heads with their coacting parts either in or apart from each other as desired, and locking them in their correct positions by means of tap bolts holding the head bearing base 4 to the table of the machine and the said spacer plates 7, 7. The spacing between the shear members $x\ y\ z$ can also be regulated, as also the lay or turns per foot of the strands in the upper and lower members respectively as will be more clearly hereinafter set forth in the specification. I consider it within the scope of my invention to use more wires than shown in Fig. 23. For instance the upper member may consist of primarily 4, 5, 6 or 7 or more wires instead of three as here shown, all of the same or different sizes as may be required for the particular specifications for the building into which this fabric is to go, the principle involved being the same as here shown and described, the construction being simply an increase in numbers of the various units comprising each cycle of operation. By this I mean in place of the transferring mechanism hereinafter shown, which successively transfers three wires from the upper to the lower member and then reversely transferring them back again, I may arrange and do include in this invention the arrangement of the operating mechanism so that this transfer mechanism could transfer 4, 5, 6 or more wires from the upper member to the lower member before the reverse operation begins of transferring the said wires from the lower to the upper member. It will also be seen that I may employ a plurality of these forming heads with their coacting mechanical parts so that I can simultaneously produce two or more fabrics side by side. It will also be seen that this machine can be built for operation and manufacture of desired fabric, vertically or horizontally as here shown, or at an angle so that the wires can pass upward instead of forward through the machine, all of which modifications form a part of this invention.

Figure 5:
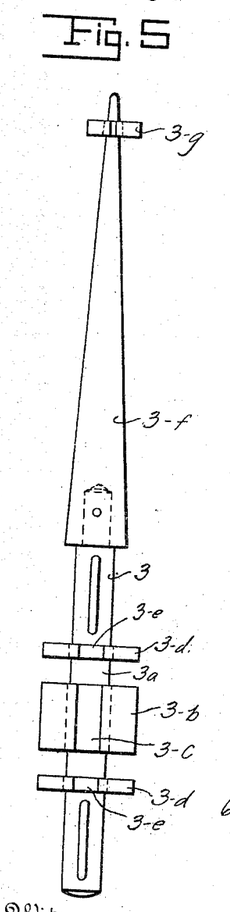
Fig. 5 is a plan view of the forming head.
Figure 6:
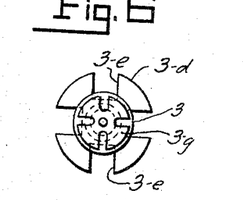
Fig. 6 is an end view of Fig. 5.
Figure 7:
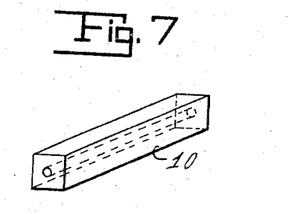
Fig. 7 shows a form of a shuttle which I employ.

The forming head 3 (see Figs. 5 and 6) consists of a central cylindrical body $3^a$ on which is integrally formed an annular shoulder $3^b$, or the shoulder may be mounted thereon as may be desired or found preferable. This shoulder is provided with a plurality of longitudinally extending slots $3^c$. In the particular machine here shown and described one of these forming heads 3 would have three such longitudinally extending slots, and which head for the purpose of clearness I designate as the right-hand head; while the other would have four such longitudinally extending slots $3^c$, and which for the purpose of clearness I designate as the left-hand head (see Figs. 3 and 4). It will readily be understood that the right-hand head forms the upper member of the fabric (see Fig. 23) in which (as shown in this construction) the maximum number of wires employed in said upper member are three, while for this construction the left-hand head employs for the maximum number of wires four as will be readily understood. Formed in said cylindrical body $3^a$ of said forming head 3 and on either side of and at equal distance from said annular shoulder $3^b$ are annular rings $3^d$, $3^d$, each of which is similarly provided with slots $3^e$ each registering exactly with the slots $3^c$ formed in the annular shoulder $3^b$ aforesaid. On either side of said annular rings $3^d$ the cylindrical body is extended forming a journal for mounting a drive gear 9 on which latter is formed an annular shoulder $9^a$ which is adapted to rotate in the bearings 2, 2. The gear 9 is keyed to the said head 3 so that the gears and head are fastened together and rotate together. Each of these gears 9, 9, is provided with slots equaling in number those formed on the said annular shoulder $3^b$ and rings $3^d$ in their respective heads 3. The slots formed in said gear are prolonged through the said shoulder $9^a$ thereof. Employed in connection with the said forming heads are a plurality of shuttles 10 preferably of rectangular form as shown in Fig. 7, or other shaped shuttles may be employed. These shuttles equal in number the number of the wires employed in the fabric and are of such a size that they fit snugly in the grooves $3^c$ formed in the said shoulder $3^b$ and the grooves $3^c$ in the rings $3^d$, $3^d$, of the said head 3, and are of a length equal to the distance the outer faces of the said annular rings $3^d$ are from each other. In other words when said shuttles 10 are placed in the annular shoulder $3^b$ their ends project in either direction so as to be flush with the outer faces of the said annular rings $3^d$, $3^d$, and project through the registering slots $3^e$ formed in said rings. Each of the said shuttles 10 is provided through its center with a longitudinally extending opening, as will be seen from Fig. 7 in the drawings. The slots formed in said gear 9 and its shoulder $9^a$ are of such a depth that the centers thereof register with the openings in said shuttles when the latter are in position in the slots formed in the said shoulder $3^b$, and rings $3^d$, $3^d$. Each of the forward ends of said forming head is shouldered forming a bearing for the cone $3^f$. On the forward end of said cone is mounted a slotted lay plate $3^g$ which forms means for guiding the wires to the die and keeping them equally spaced. Formed on each of the said bearing boxes 2, 2, 2, 2, is a bearing 11. Each pair of the said housings 2 therefore, provide a bearing for a shaft, as 12 and $12^a$, on each of which are mounted two pinions 13, 13, by means of which latter the heads are rotated. The driving mechanism is so arranged that the said forming heads 3 rotate in the same direction.

Adjacent to the machine and connected thereto, is a drive pulley 14 (see Fig. 1 of the drawings) mounted upon a shaft 15 carried in suitable bearings 16, 16. Mounted upon said shaft 16 is a drive gear 17 which meshes with spur 18 mounted on a shaft 19. Loosely mounted on the shaft 19 is a drive spur 20 which meshes with a spur 29 mounted on a shaft 22 carried in suitable bearings, formed on the machine. Adjacent to said drive spur 20 is a clutch 23 operated by a lever 24. Adjacent to said clutch 23 and loosely mounted on said shaft 19 is a second drive spur 25 which is similarly provided with a clutch 26 operated by a lever 27 (see Fig. 2). In the drawings the said levers 24 and 27 lie in the same oblique plane so that in the end view shown in Fig. 2 their lines coincide. The said clutch 26 is a double acting clutch and is also attached to engage a loosely mounted drive spur 28 (see Fig. 1) also located on shaft 19. The three drive spurs 20, 25 and 28 aforesaid, are of different sizes and mesh with pinions 29, 30 and 31 respectively, forming thereby a nest of gears giving three different speeds. The three latter gears 29, 30 and 31 are mounted on the shaft 22 carried in suitable bearings formed on rocker arms $22^a$ and $22^b$ (see Figs. 1 and 2); and on the forward end of said shaft 22 is mounted an intermediate gear 32 meshing with the pinion 21 mounted on the forward end of the shaft 12. It will thus be seen that by properly operating the said levers 24 and 27 and thereby their clutches, three distinct and different speeds can be given the left-hand forming head 3 aforesaid while for the first section of the fabric the said forming head remains stationary inasmuch as both levers and their respective clutches are thrown out of gear. Keyed to said shaft 19 is a bevel 33 which meshes with the bevel 34 mounted on a cross shaft 35 carried in bearings formed in the table 1. The opposite end of the shaft 35 carries a bevel 36 keyed thereto (see Fig. 1) which in turn meshes with a bevel 37 carried on a shaft 38 mounted in bearings formed on the machine. Loosely mounted on said shaft 38 are drive spurs 39 and 40 which are of different diameters with a double acting clutch 41 mounted therebetween. Said clutch 41 is connected to a rod 42 projecting through the machine and terminating in a lever 43 adjacent to the operating levers 24 and 27 aforesaid. By means of said lever 43 the drive spurs 39 and 40 can be respectively thrown in or out of gear as desired. Meshing with said spur gears 39 and 40 are pinions 44 and 45 of different diameters forming respectively with the said spurs 39 and 40 a nest of two speeds. The said pinions 44 and 45 are mounted on a shaft 46 journaled in two rocker arms $46^a$ and $46^b$ and carrying at its front end an intermediate spur 47 which drives a pinion 48 mounted on the shaft $12^a$ of the right hand head of the machine and on which shaft $12^a$ are mounted the pinions 13, 13 aforesaid, which rotate the right-hand head of the machine. It will thus be seen that the right hand head and the left hand head are both driven from the pulley 14 aforesaid through gears and shafting described and the right hand forming head can be held stationary or operated at two distinct speeds while the left hand forming head can be held stationary or operated at three distinct speeds. It will readily be understood that further and additional variation of speed can be given either or both of these heads by the sole addition of extra pairs of drive gears mounted on said shafts 19, 22 and 38, 46 and any pair of which may be thrown in or out of gear by a clutch mechanism similar to that described. These variations of speeds for the forming heads are necessary, as will be readily understood from Fig. 23, for as the number of wires to be twisted together varies, so must the lay or turns per foot vary; and inasmuch as the speed at which the fabric is pulled through the machine continues constant, such variation must necessarily be provided for by an alteration of speed in the rotating heads inasmuch as the lays or turns per foot depend and are controlled by the ratio between the speeds of the drawing out mechanism and the rotating or stranding mechanism. It will further be seen that inasmuch as the intermediate or connecting gears 32 and 47 with their respective shafts 22 and 46 are mounted on rocker arms $22^a$, $22^b$ and $46^a$, $46^b$ the said right hand and left hand forming heads can be moved toward or apart from each other as may be desired, for the purpose of varying the height A (see Fig. 23) of the fabric.

Figures 14, 15, 16, 17, 18:
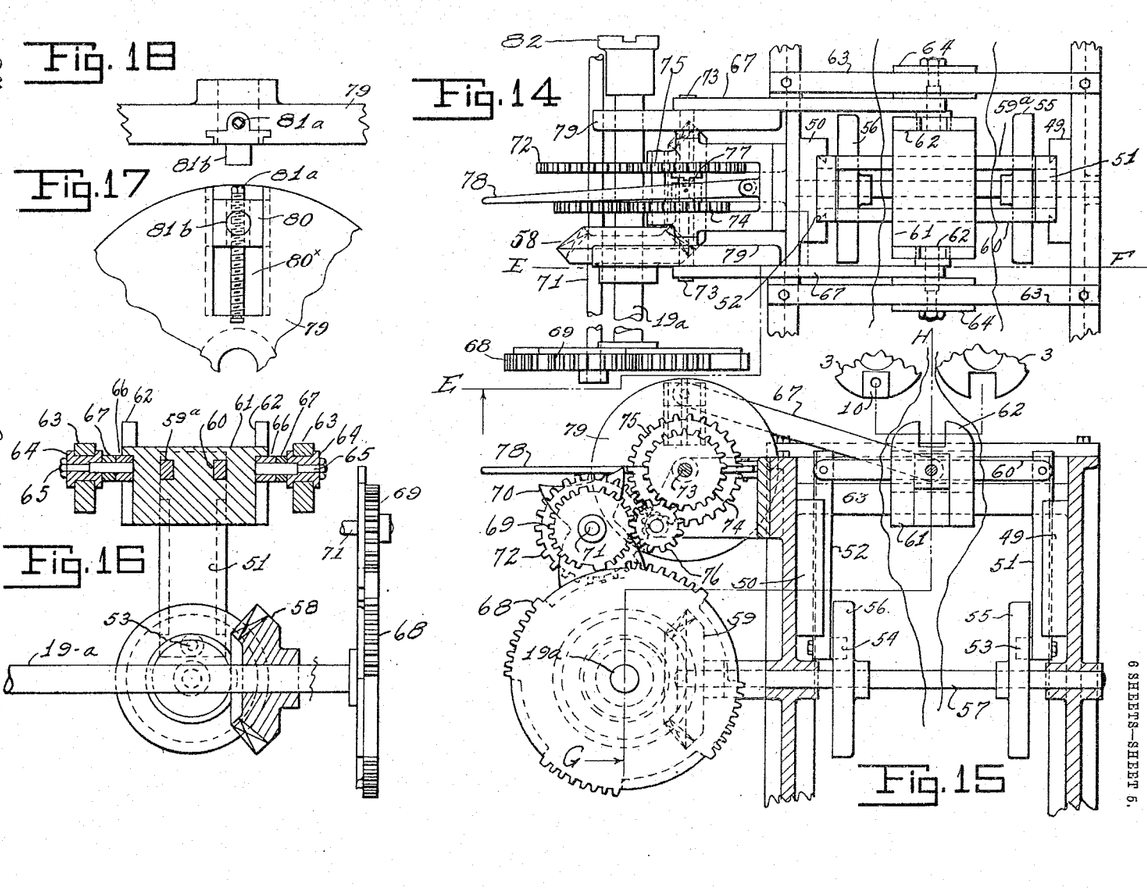
Fig. 14 is a plan view of the transforming mechanism.
Fig. 15 is a sectional view on the line E. F. of Fig. 14 looking in the direction of the arrow.
Fig. 16 is a sectional view on the line G. H. of Fig. 15.
Figs. 17 and 18 show a detail of construction in the crank motion of the transfer as shown in Figs. 14 and 16.

Formed on the inner sides of table 1 are rectangular vertical projections 49 and 50 (see Figs. 14 and 15) in each of which is a dovetail vertical extending slot in which fit and are vertically movable guide blocks 51 and 52. The lower ends of these guide blocks are fastened by means of studs 53 and 54 to their respective cam plates 55 and 56 mounted on a shaft 57 journaled in bearings formed in the said table 1. Mounted on the shaft $19^a$ is a bevel gear 58 which meshes with the bevel 59 keyed to the outer end of said shaft 57. The cam grooves formed in plates 55, 56 aforesaid, are of such a contour that as the said bevel 58 drives said bevel 59 and its corresponding shaft 57, the said guide blocks 51 and 52 are raised and lowered and in a manner and at a degree that may be predetermined as desired, lifting and lowering thereby the transfer mechanism hereinafter described and which is carried on the upper ends of said guide blocks 51 and 52. Securely and rigidly fastened to said guide blocks 51 and 52 are cross bars $59^a$ and 60 (see Figs. 14, 15 and 16) on which is mounted the transfer head 61. The said transfer head 61 is of a length equal to the space between the inner faces of the said annular rings $3^d$, $3^d$, in each of the said forming heads $3^a$ (see Fig. 5). Said transfer head has on its upper surface and at each end upwardly projecting shoulders 62, transversely extending across the upper face of said head and each shoulder has a rectangular slot therein equaling in size the cross section of the said shuttle 10 (see Fig. 7) and which slot is also equal in size to those formed in the said annular shoulder $3^b$ and annular rings $3^d$, $3^d$, on said forming head 3 (see Fig. 5). It will also be readily understood that this transfer head is so constructed and operated that it periodically and successively approaches first the left hand head and successively and periodically removes therefrom the various shuttles therein contained and transfers them at the proper moment into the right hand forming head, thereby forming the shear members of the fabric. This transfer mechanism subsequently removes the said shuttle from the left hand forming head to the right hand forming head after the middle section embracing all of the wires in the fabric has been spun, thus forming the shear members on the reverse end of the fabric unit. The thickness of the shoulder projections 62 on the upper face of said transfer head is equal to the space between the inner face of the said annular ring $3^d$ and adjacent face of said annular shoulder $3^b$ of said forming head 3, (see Fig. 5) so that as the transfer head moves up toward the forming head the shoulders enter the annular slots formed between the adjacent faces of the said rings $3^d$, $3^d$, and the corresponding ends of the annular shoulder $3^b$ respectively. The outer ends of said transfer head 61 are provided with vertical extending slots formed therein to a predetermined point just below the said shoulders 62, 62. Rigidly connected to said table 1 are cross bars 63, 63 (as shown in Figs. 14, 15 and 16) in which longitudinally extending slots are formed and in each of which slots is mounted a sliding block 64. The shouldered studs 65, 65 (see Fig. 16) are connected to each of said sliding blocks and each has on its inner end a rectangular collar 66, which snugly fits in said slots formed in the opposite ends of said head 61. Engaging said studs 65, 65 are the inner ends of crank arms 67, 67 (see Fig. 14, 15 and 16) which as will be hereinafter shown drive the transfer head 61, back and forth while the cam plates 55, 56 simultaneously raise and lower the said head 61 sliding as it does on the collared ends of said studs 65, 65.

Mounted on the shaft 19ª is an intermittent gear 68 which is adapted to drive a pinion 69 at predetermined moments. A pawl action 70 insures the accuracy of the starting and stopping of said drive moments. The said pinion 69 is mounted on a shaft 71 in which is also keyed a spur 72. A shaft 73 is mounted in suitable bearings formed in the machine and has keyed thereto two spurs 74 and 75 respectively. The spur 75 meshes directly with said spur 72 and spur 74 meshes indirectly through an intermediate 76 with the spur 69. The ratio between said spurs 75, 72 and 74, 69 is one to one, so that the speed transferred to shaft 73 from shaft 71 is the same in both cases, but the direction of rotation of said shaft 73 is reversed as the two or three gear trains are thrown in mesh. Between these gear trains is keyed a double jawed clutch 77 (see Fig. 14) which is actuated by a lever 78 pivoted to the machine. It will thus be seen that by means of the lever 78 the motion of the transfer head 61 aforesaid can be reversed, or thrown out of gear so as to remain stationary. Mounted on said shaft 73 are two link plates 79, 79. A detail of these plates is shown in Figs. 17 and 18 of the drawings. A sliding block 80 is mounted in a radial rectangular slot 80ˣ formed in said plate and is adjustable therein by means of a threaded stud 81ª. A transversely extending stud 81ᵇ forms means for connection to the links 67, 67, thus forming means for adjusting the travel of the said transfer head 61. The operation of this transfer head mechanism will be readily understood from the foregoing description when taken in connection with the following statement. In connection with Fig. 15 is shown the end view of the left hand and right hand forming head at a predetermined distance from each other. The transfer head 61 as shown is in the center or neutral position below and out of the way of the rotating heads. It is desired at a predetermined moment to transfer the wire $z$ (see Fig. 23) from the upper member of the fabric to the lower member. At the proper moment lever 78 is thrown in gear so that the transfer head 61 is driven to the left under the left hand forming head in which the shuttle 10 is resting, and carrying the wire $z$ in its longitudinal opening. Arriving directly below the center of the left hand head the cam plates 55 and 56 rotating through the drive mechanism heretofore described raise the transfer head 61 until the predetermined shuttle 10 rests in the slotted shoulders 62 of the transfer head releasing a lock mechanism not here shown, but which may be of any desired construction, whence the cam plates 55 and 56 still rotating lower the transfer head 61 below the left hand forming head and at a sufficient distance to clear the same, whence the link mechanism 67 drives the head 61 to the right to the center or neutral position. At this moment the intermittent gear 68 stops this transfer motion and the forming heads and pull out mechanism are again thrown in gear and the fabric is produced until the proper moment is reached for placing the wire $z$ in twist with the wire $w$ of the lower member fabric. At this moment the gear 68 drives the link 67 forcing the said head 61 to the right and below the right hand forming head 3 when the cam plates 55 and 56 aforesaid elevate the head 61 until the shuttle 10 is placed in position in the right hand forming head, when the head is again lowered and returned to the center or neutral position.

It will be seen that the intermittent gear 68 is so constructed that in conjunction with the cam plates 55 and 56 the successive moments for pause and action necessary for the transfer head to receive are harmoniously timed so that the constituent elements of the cycle are mechanically predetermined and the successive moments of motion and rest accurately and successively provided. After the center four wire (or more) section of the fabric is spun (see Fig. 23) the lever 78 is thrown to the right (or left respectively) so that the transfer head 61 in this instance begins its cycle of operation toward the right-hand forming head instead of the left hand as described, thus returning the wires $x, y, z$, respectively to the upper member of the fabric.

It will readily be seen that by a change of bevels 58, 59, and the intermittent gear 68 and pinion 69 together with necessary changes of the cam plates 55 and 56 that the space between the wires $x, y, z$, etc., can be readily predetermined and varied as may be desired or that by a multiplicity of the cycles any desired practical number of wires can be respectively transferred from one member of the fabric to the other and back again.

Figure 1:
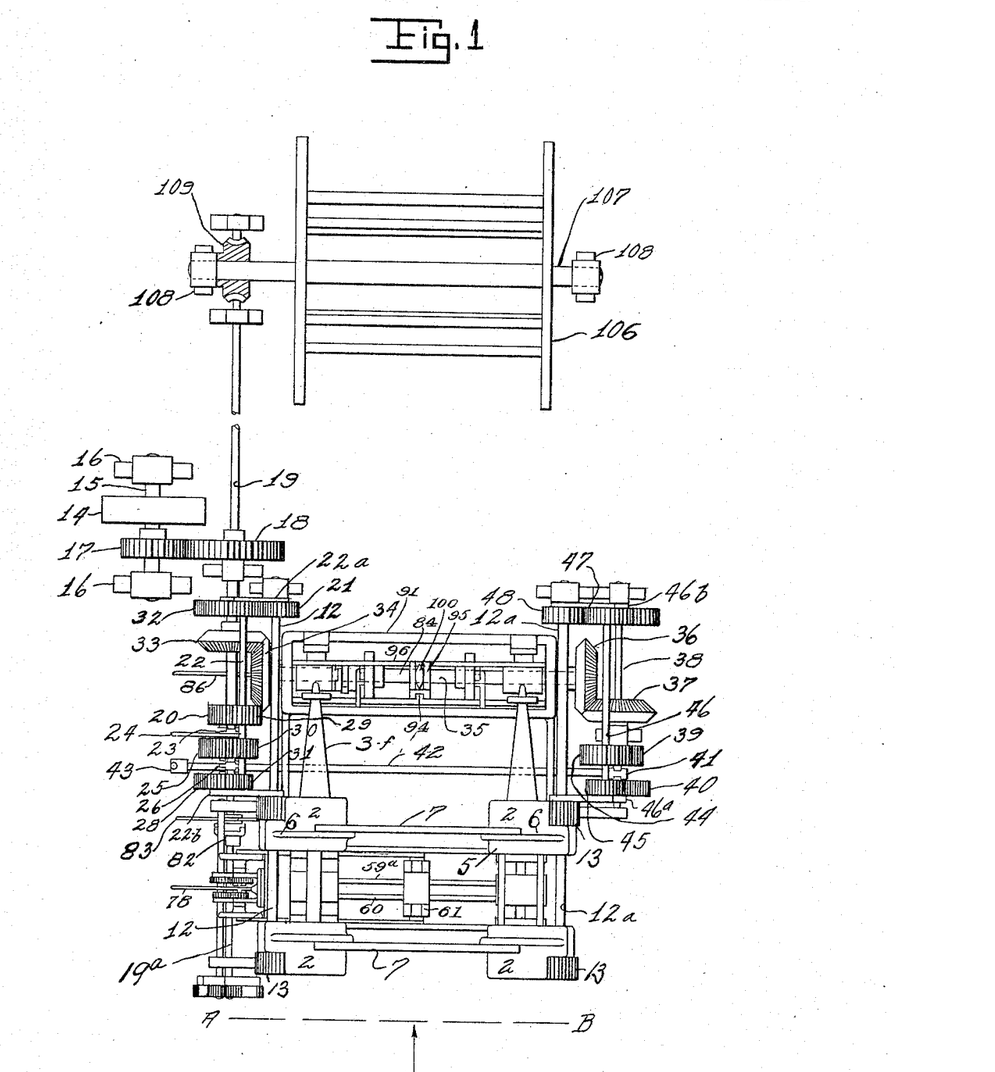
Figure 1 is a plan view of the machine embracing my invention.

For the purpose of stopping and starting the entire transfer mechanism at the proper moment a clutch 82 is mounted on the end of the shaft 19ª which is operated by a lever 83, (see Fig. 1 of the drawings).

Figure 19:
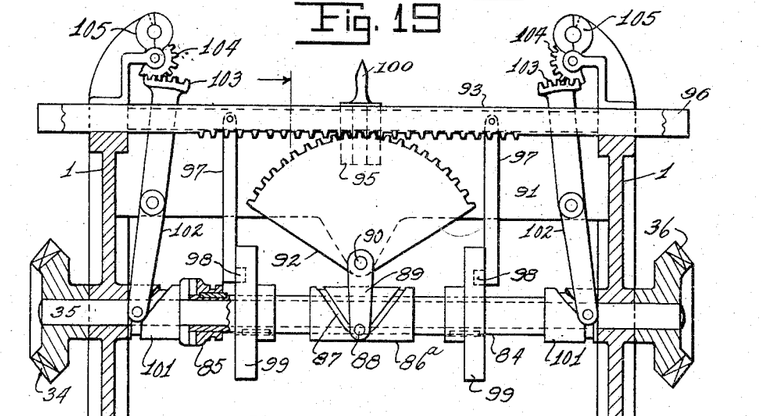
Fig. 19 is an end elevation partially in section of the wire bender and split die mechanism, employed in the machine.

Loosely mounted on the cross shaft 35 is a sleeve 84 which can be positively connected to the shaft 35 by a clutch mechanism 85 (see Fig. 19) which clutch is controlled by a lever 86 (see Fig. 1).

Figure 20:
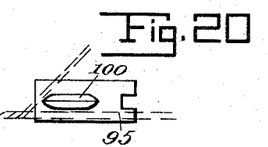
Fig. 20 is a diagram showing the relative position of the wire bender in relation to the stranded wires.
Figure 21:
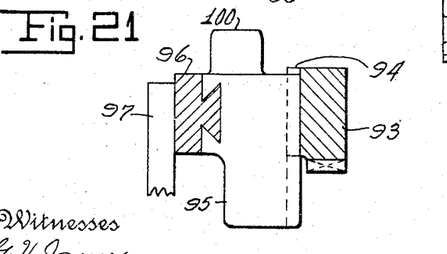
Fig. 21 is an elevation in partial section on an enlarged scale of the wire bender.
Figure 22:
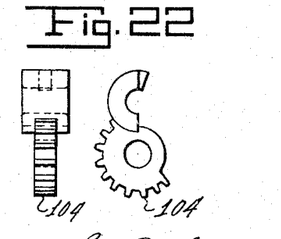
Fig. 22 is a partial end and a partial side elevation of the movable half of the split die employed in the machine.

Mounted on the sleeve 84 is a cylinder 86ᵃ on the outer surface of which is formed a cam groove 87 in which latter fits a stud 88 on a lever 89. The lever 89 is keyed to a shaft 90 mounted in a bearing formed on a bar 91 attached to the table 1. Keyed to the shaft 90 is a toothed segment 92 engaging a horizontal movable rack 93 (see Fig. 19). The cam cylinder 86ᵃ is made so that it can be removed from the said sleeve 84 and another inserted if desired so that the throw of said rack 93 can be adjusted from time to time to fit the width of the fabric. The inner face of this rack has a projecting shoulder 94 which fits into a vertical groove formed in a wire bender 95, and the said wire bender 95 is adapted to slide back and forth transversely across the machine on a bar 96 to which it is connected by a tongue and groove. The said bar 96 is movable upward and downward by means of rods 97, 97, which engage through studs 98, 98 at their lower ends in a cam groove formed in two cam plates 99, 99, keyed to the collar 84. The upper end of the wire bender 95 has a nose 100 formed thereon, the upper edge of which is terminated in a knife edge as will be seen from Figs. 19 and 20 of the drawings. The object of this bender is to act in conjunction with the transfer mechanism hereinbefore described, and rises at the proper moment to separate the vertical wire to be transferred from one member to the other of the fabric from its predetermined position and carries it across the width of the machine to deposit it in the other member of the fabric and in the split dies in conjunction with which it works and which are hereinafter described. Fig. 20 shows a diagram indicating the relative position of said wire bender at its extreme position right or left. It will be understood that the transfer mechanism as it carries the wire from one head toward the other naturally draws this wire out from the member with which it was then formed; at this moment, this said wire bender 95 is raised and its nose 100 enters between the wire thus removed and the member as shown in Fig. 20 and is then driven in harmony with the transfer mechanism across the table, and places the wire at the proper moment in the opposite die. The wire bender rises and falls so as to keep out of the horizontal plane of the manufacture of the fabric, which will be seen from Figs. 2 and 19 as the horizontal plane formed by the centers of the forming heads and the split dies.

Connected to the sleeve 84 are two cam sleeves 101, 101 engaging the lower ends of the double armed levers 102, 102 pivoted on said table 1. The upper ends of said levers 102, 102, form rack heads 103, 103, which engage respectively toothed segments 104, 104 formed on the lower sides of the movable sides of the split dies 105, 105. It will be seen that as in all wire machinery it is necessary and preferable to have a die for giving the respective wires of the strand a regular twist. It is immaterial in ordinary practice whether this die is larger than the diameter of the desired strand so long as its function of forming a guide for the direction of the wires into the strand is performed.

It will be readily seen that variations and modifications may be employed without departing from the spirit of the invention, the essential features of which are the two forming heads with the transfer mechanism and a wire bender for "setting" the individual wires as they are transferred from one member to the other of the fabric together with means for twisting or stranding the various wires forming the different members of the reinforcement at the same or different turns per foot and intermediately transferring certain of said wires back and forth from one member to the other. It will also be understood that in place of the various actuating levers shown, additional cams may be employed with intermittent drives for automatically throwing in and out of gear the forming heads, transfer mechanism and wire bender, etc., at the proper moment and in the proper sequence.

Connected with the shaft 19 is a pull-out mechanism which comprises a drum 106 mounted on a shaft 107 carried in suitable bearings 108, 108, and which may be connected to the shaft 19 by a worm 109. The worm connection as here shown may be employed or any other suitable and satisfactory friction driven construction as may be desired. Or in place of winding the fabric direct from the machine on this drum, an intermediate or capstan wheel may be employed, or in place of either of the constructions a traveling pull-out consisting of clamps on an endless chain may be used in connection with the machine.

The operation of this machine will be readily understood from the foregoing description and accompanying drawings when taken in connection with the following statement. Wires sufficiently long for one unit, as shown in Fig. 23 of the drawings or of a plurality of such units are cut to length and inserted in the machine from the rear of the forming heads. For the purpose of this description I shall describe the fabric consisting of four wires as shown in Fig. 23, although it is to be understood that any reasonable or predetermined number of such wires may be employed as has been heretofore described. The right-hand head in this particular instance carries three shuttles which are mounted in position in the right-hand forming head while one shuttle is mounted in the left-hand forming head to begin with. Three wires are consequently passed through the three shuttles of the right-hand forming head and one wire through the single shuttle on the left-hand forming head. These wires are led down to the stranding point and fastened to a rod or strand of the pull out mechanism. Power is then thrown on the machine drive shaft 19 and simultaneously lever 43 is so actuated that the proper speed of the three-wire strand is given to the right-hand head. The left-hand head is permitted to remain stationary as the lower member at this part of the fabric comprises but one wire $w$. At the proper and predetermined moment the right hand forming head is thrown out of gear, the transfer mechanism thrown in and one shuttle of its wire removed from the said right-hand head, while simultaneously coacting with said transfer the wire bender picks up this particular wire and moving simultaneously with the transfer head carries the said wire out to the central or neutral position of the transfer head. When by further throwing the lever 43 over to the upper speed gear the right hand forming head is again set in motion at a speed proper to the two wire twist, the left hand forming head still remaining stationary. At the correct predetermined moment the transfer mechanism is again brought into operation through the intermittent gear drive and the wire it is transferring with its shuttle is placed in the left-hand forming head, simultaneously the die, in front of the left hand forming head is opened and the wire bender forces the wire into the die and "sets" it at this point. The proper speed drive is then thrown in for the left hand forming head and the two wires on the lower member are then twisted together mechanically while the right hand head is simultaneously twisting the two wires on the upper member. This cycle of operation is then continued until the several wires on the upper member are successively brought down to the lower member whence the right-hand forming head is thrown out of gear and remains stationary while the left-hand forming head, having then received the four (or more) wires, twists or strands them together to form the center section of the fabric as will be understood from Fig. 23. Upon the completion of this center section the mechanism and transfer is then reversed by the various levers heretofore described so that these various wires are retransferred to the upper member of the fabric until the unit, as shown in Fig. 23, is completed. In case a plurality of units are desired, that is, a continuous quantity of fabric of any desired length is required, the operation first described is merely duplicated until the desired number of units, each of the required length, width and proper space of the shear members is accomplished. In order to support the loose back ends of this wire when first placed in the machine, I employ a table of any desired length, not shown in the drawings, on which these wires rest, and owing to their size and stiffness all and any danger of their becoming entangled one with the other is eliminated.

It will thus be seen that I have invented a machine with which it is possible to produce a fabric for reinforced concrete construction, in which the cross section at any point of said fabric, is at all times equal; in which the successive shear members are transferred from the upper to the lower members of said fabric at points desired; in which the various wires of the upper and lower members of the fabric are twisted together at proper and desired turns per foot; in which fabric of any desired size and spacing can be produced by simply adjusting the machine and in which all of these various and successive steps for manufacture are automatically provided for in the construction of the machine.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. A machine for the manufacture of twisted wire truss reinforcement fabric for reinforced concrete construction, having means for twisting a plurality of wires into an upper member, means for twisting a plurality of wires into a lower member, means for transferring a wire from one member to another to form a shear member, and means for varying the number of turns per foot of the said upper and lower members.

2. A machine for the manufacture of twisted wire truss reinforcement fabric for reinforced concrete construction, having means for twisting a plurality of wires into an upper member, means for twisting a plurality of wires into a lower member, means for transferring a wire from one member to another to form a shear member, and additional means for twisting the individual wires of the said upper and lower members at a prearranged and adjustable variation in the number of turns per foot.

3. A machine for the manufacture of twisted wire truss reinforcement fabric for reinforced concrete construction, having means for twisting a plurality of wires to form an upper member, means for twisting a plurality of wires to form a lower member, means for transferring a wire from one member to another to form a shear member, and means for varying the position of such shear member.

4. A machine for the manufacture of twisted wire truss reinforcement fabric for reinforced concrete construction, having means for twisting a plurality of wires to form an upper member, means for twisting a plurality of wires to form a lower member, means for transferring a wire from one member to another to form a shear member, and means for adjusting the distance between such upper and lower members.

5. A machine for the manufacture of twisted wire truss reinforcement fabric for reinforced concrete construction, having means for twisting a plurality of wires into an upper member, means for twisting a plurality of wires into a lower member, and means for transferring a wire from one member to another to form a shear member, together with additional means for regulating and controlling the angles formed between said shear member and said upper and lower members.

6. A machine for the manufacture of twisted wire truss reinforcement fabric for reinforced concrete construction, having means for twisting a plurality of wires to form an upper member, means for twisting a plurality of wires to form a lower member, the parts being so disposed as to have an equal cross-sectional area at all points, additional means for twisting the individual wires of the said upper and lower members at a prearranged and adjustable variation in the number of turns per foot, and means for successively transferring and retransferring the individual wires of the upper member and lower member back again.

7. A machine for the manufacture of twisted wire truss reinforcement fabric for reinforced concrete construction, having means for twisting a plurality of wires simultaneously in two parallel rows and means for successively transferring the wire from one row to the other for the purpose of forming a shear member, with additional means for regulating the turns per foot on each row of the parallel rows of strand.

Signed at New York city in the county of New York and State of New York this 12th day of January A. D. 1908.

LEWIS RANSFORD COMPTON.

Witnesses:
C. A. HURLEY,
C. B. FUGSTADT.